March 26, 1968 R. P. LAZZARA 3,374,502

SPRUE BUSHING AND NOZZLE ASSEMBLY

Filed Oct. 12, 1965

INVENTOR.
RALPH P. LAZZARA

BY Kenwood Ross

ATTORNEY.

United States Patent Office 3,374,502
Patented Mar. 26, 1968

1

3,374,502
SPRUE BUSHING AND NOZZLE ASSEMBLY
Ralph P. Lazzara, Westfield, Mass., assignor to Osley &
Whitney, Inc., Westfield, Mass., a corporation
Filed Oct. 12, 1965, Ser. No. 495,206
1 Claim. (Cl. 18—30)

ABSTRACT OF THE DISCLOSURE

In an injection molding machine of the type wherein an injection nozzle is engageable in a recess of a bored sprue bushing on a heated sprue extension having a bore which communicates with the bore of the sprue bushing whereby molten thermoplastic material fed under pressure into the injection nozzle is directed through the sprue bushing and sprue extension, the improvement in means for precluding leakage of thermoplastic material from the sprue bushing comprising: a pair of valve seats, one adjacent the recess in the sprue bushing and one adjacent the bore of the sprue extension, and a shut-off ball valve freely mounted in the bore of the sprue bushing for limited movement between said valve seats, said shut-off ball valve when seated against the valve seat adjacent the bore of the sprue extension permitting the introduction of molten thermoplastic material into the bore of the sprue extension and when seated against the valve seat adjacent the recess in the sprue bushing precluding the leakage of thermoplastic material from the sprue bushing following removal of the injection nozzle from engagement in the recess.

---

My invention relates to molding plastic materials and in particular it provides means adapted for use on machines for the injection molding of thermoplastics, which means serves as a shut off nozzle to preclude the drooling or dripping of thermoplastic material from a sprue bushing following injection thereinto from an injection nozzle on each cycle of machine operation.

Present day techniques of injection molding generally require high pressure injections of thermoplastic material in a fluidized (heated) condition from an injection nozzle and into a die cavity or a plurality thereof formed in a sectional mold which mold is separable into parts along a parting line for removing therefrom the solidified molded articles.

In the injection molding art, single-cavity and multiple-cavity molds are sometimes constructed in manner such that the molten plastic feeds through a sprue bushing to a longitudinal runner and through small branch runners and finally is gated into a piece part. That is, techniques sometimes require that a sprue channel and a multiplicity of distributing runner channels radiating therefrom be formed in the mold to provide fluid communication in that area intermediate the orifice of the injection nozzle which discharges the thermoplastic material into the entrance port of the mold and the die cavity or cavities of the mold.

It has been necessary, too, for the operator either to shear or shake off the parts to break them from the runner system. That is, when charging the cavities, some material remains in the sprue and runner channels and forms spider-like solidified sprues connected to the molded article or articles, necessitating the unitary ejection of formed articles and sprues from the mold and the subsequent separation of one from the other, the sprues being reworked for use in later molding cycles.

With the broadening of the plastics markets, the introduction of new molding materials, and the designing of new molding machinery, the demand for faster cycling times has been most pressing, dictating improvements in ways and means effecting the plastic flow system, particularly in the area between the injection nozzle and the mold cavity, where the impetus has been forward in the directions of devices for maintaining the material at temperatures high enough to insure flow whether or not pressure is being exited through the injection cylinder and of eliminating the wastage of time and material represented in the solidified sprues and the degating thereof.

In more modern equipment, the sprue and runner channels are commonly filled with molten thermoplastic material throughout the full cycle of each injection, the cycle as the term is used being understood to include the sequential operations of injection, solidification and ejection.

Various means have been developed for solving the problems of freezing and drooling at the mouth of the injection nozzle, but other problems have arisen with respect to drooling at the sprue bushing in those installations where there is a physical separation of injection nozzle and sprue bushing during some portion of the molding cycle.

Any interruption of communication, no matter how momentary, between the injection nozzle and mold cavity means a stoppage in the forward pressured flow of the material through the injection nozzle and accordingly a concomitant relaxation of the forward pressure. Therebecause, flow in a retrograde direction from the cavities through the sprue channels and outwardly of the sprue bushing is sometimes experienced in the form of drooling or dribbling from the sprue bushing.

The strategic location of a quick-acting valve serves to preclude such drooling and retains a charge of the molten plastic forwardly of the injection nozzle and in the runner system of the mold itself which molten plastic has been precompressed to or near the compression limit of the plastic material and offers and is permitted an extra fast initial flow, all with the obvious advantage of permitting shorter cycles particularly with pieces requiring long flows or having thin sections.

By the invention hereof, valve means are employed at the sprue bushing operable independently of the injection device although in timed relation therewith.

Figure 1:
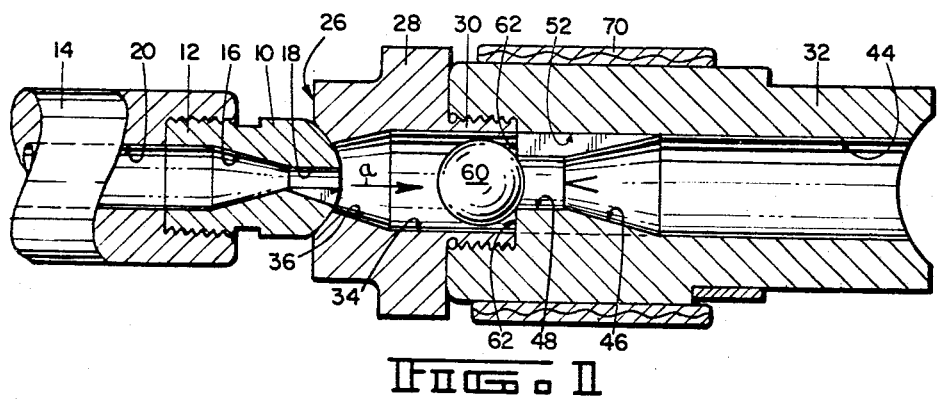
FIG. 1 is a diagrammatic view in section of the component parts of a typical sprue bushing and nozzle assembly showing the parts in an injection position.

As is known, the standard form of injection molding press for molding a thermoplastic material is basically constituted by a pair of opposed mold-backing abutment plates and an injector all mounted upon a base frame.

One of the abutment plates is a resistance member held in a fixed position or having a limited movement and the other thereof is a pressure transmitting member reciprocable toward and from the resistance member to close and open the sectional mold as defined by a pair of companion platens, one mounted on each of the abutment plates so as to lie in confronting and partible relation as to each other.

The movable abutment plate is slidably mounted on such as tie bars or strain bars and is rigidly fixed to a main power operated ram so as to be caused to reciprocate horizontally, or vertically, to open or close the cooperating platens. All of same is known and is not here illustrated for the sake of brevity, same not forming a part of the present invention.

As also known, the injection mechanism for feeding fluent molding material to the mold is connected normally to the fixed abutment plate in fluid communication with the fixed platen and may have communication with a hopper from which a supply of the material flows in measured quantities relative to a hydraulically operated feed piston or a rotating feed screw into a heated feed cylinder from which it is fed forwardly to an injection nozzle for forward discharge outwardly therethrough and therefrom.

And as also known, suitable heating means such as an electrical or hot oil heating mantle is preferably disposed relative to the heating chamber to accomplish the heating necessary to fluidize the molding material.

Enough material for several molding cycles is present in the heating cylinder at any given time and the newly introduced material becomes increasingly plasticized as it approaches the injection nozzle under the injection and stuffing action of the injection plunger.

Now with reference to the accompanying drawing, the injection nozzle 10 extends forwardly from the fixed platen in known manner and is threadedly engaged at 12 with the forwardly-facing extremity of a nozzle housing 14.

Injection nozzle 10 is provided with a longitudinal opening 16 therethrough having a reduced portion 18 at its outlet end, which opening is coaxially aligned and in communication with a passage 20 through the nozzle housing.

The forward face of the injection nozzle is provided with a curvate surface 22 so as to be nestably received in a complemental surface 24 of a recess in the outboard face 26 of a sprue bushing 28.

Sprue bushing 28 is threadedly engaged at 30 with a sprue extension 32 and is provided with a longitudinal passage therethrough commencing at its inboard end as a large-diameter opening 34 which reduces by way of a central conical recess 36 to merge into a small-diameter opening coaxial with the said recess, said small-diameter opening communicating with opening 18 in injection nozzle 10 when the injection nozzle is mated with the sprue bushing.

Sprue extension 32 is likewise provided with a large-diameter central passage 44 therethrough which reduces by way of a counterbored central conical recess 46 toward its outboard end communicating with a small-diameter bore 48 coaxial with large-diameter opening 34 of sprue bushing 28.

Conical recess 46 of sprue extension 32 communicates with a plurality of straight, axially-extending channels 52 radially-arranged and peripherally interspaced about the axis of opening 48 and equi-spaced as to each other so as to define subdivided flow paths through which plastic material may flow between large-diameter bore 34 of sprue bushing 28 and large-diameter bore 44 of sprue extension 32.

Figure 2:
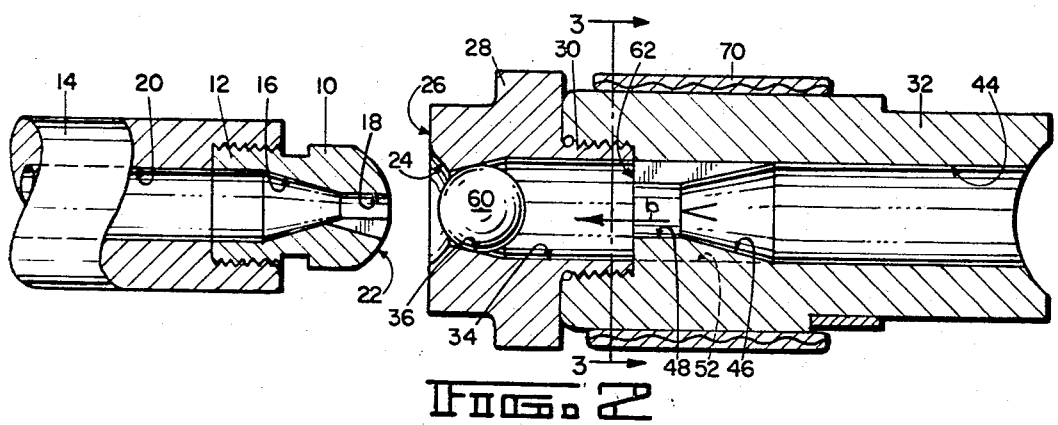
FIG. 2 is a diagrammatic view in section of the component parts exemplified in FIG. 1 showing the parts in a non-injection position.
Figure 3:
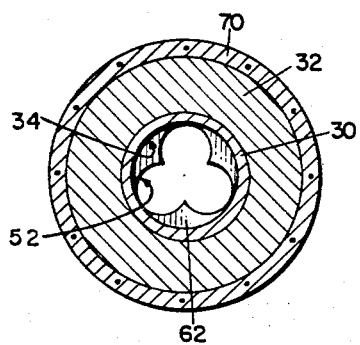
FIG. 3 is a view in section on the line 3—3 of FIG. 2.

A shut off ball 60 is freely mounted within large diameter passage 34 of sprue bushing 28 to have limited movement in inboard and outboard directions denoted by arrows *a* and *b* respectively, the outboard direction of travel being defined at an outboard terminus indicated in FIG. 2 where it seats in central conical recess 36 and the inboard direction of travel being defined at an inboard terminus as indicated in FIG. 1 where it is pressed against the shoulder 62 defined by small-diameter bore 48.

Electrical resistance heating elements are located in a collar 70 sleeving the sprue extension to maintain it at a high temperature sufficiently above the solidification temperature of the thermoplastic being handled to insure retaining the thermoplastic in the sprue bushing and sprue extension in a fluid injectable condition.

In the FIG. 1 position of the ball, the injection position, the plastic material is allowed to pass freely from the tip of the injection nozzle into the passage 34 of the sprue bushing into the axially arranged channels 52 and into the conical recess 46 and large diameter bore 44 of the sprue extension.

In the FIG. 2 position of the ball, then non-injection position, the backward pressure of the plastic material in the sprue extension will be seen to be sufficient to cause the ball to move in retrograde direction so as to seat in the central conical recess 36 and thus prevent any retrograde movement of the material by sealing off the opening of the sprue bushing.

From the description, it will be apparent that during injection the ball is adapted to be forced from its seat and pressed forwardly toward shoulder 62 of sprue extension 32.

Thus when the mold is ready for cavity filling, the pre-compressed plastic gushes into the mold of its own volition without any initial forward movement of the injection ram. The ram follows up the compressed material and follows through to fill the mold.

When the mold cavity is completely filled with material, the injection ram has bottomed and the valve is now ready for closure.

The injection mold is still closed and the ram retracted to permit more material to flow from the feed ahead of the ram for the next injection or precompression of the plastic.

By retracting the ram before the mold has opened, all the built up energy caused by injection is released.

After the valve has closed and during the curing cycle, the injection ram again precompresses the new charge of material in the injection system preparatory to recharging the runner system of the mold.

Regardless of how the plastic material in the injection cylinder is injected into the mold it has a very short plastic life so that it is important to get the material into the mold as quickly as possible after the plastic leaves the hot zone or the nozzle.

The plastic is of a thermoplastic nature and, therefore, it solidifies, wherefore injection time is of the essence.

I claim:

1. In an injection molding machine of the type wherein an injection nozzle is engageable in a recess of a bored sprue bushing on a heated sprue extension having a bore which communicates with the bore of the sprue bushing whereby molten thermoplastic material fed under pressure into the injection nozzle is directed through the sprue bushing and sprue extension, the improvement in means for precluding leakage of thermoplastic material from the sprue bushing comprising: a first valve seat adjacent the recess in the sprue bushing comprising a conical opening communicating with the recess and the bore of the sprue bushing, a second valve seat adjacent the bore of the sprue extension comprising a circumferential shoulder which extends into the bore of the sprue extension, and a shut-off ball valve freely mounted in the bore of the sprue bushing for limited movement between said valve seats, said shut-off ball valve when seated against the second valve seat permitting the introduction of molten thermoplastic material into the bore of the sprue extension and when seated against the first valve seat precluding the leakage of thermoplastic material from the sprue bushing following removal of the injection nozzle from engagement in the recess, the bore of the sprue extension communicating with a plurality of axially-extending channels radially-arranged and peripherally interspaced about the axis of the bore and communicating with the recess in the sprue bushing to define a plurality of subdivided flow paths surrounding the second valve seat through which the thermoplastic material may flow.

References Cited

UNITED STATES PATENTS

| | | | |
|---|---|---|---|
| 2,892,214 | 6/1959 | McCarthy | 18—401 X |
| 3,109,199 | 11/1963 | Hardy | 18—30 |

WILBUR L. McBAY, *Primary Examiner.*